United States Patent [19]

Hamada et al.

[11] Patent Number: 4,885,340

[45] Date of Patent: Dec. 5, 1989

[54] HIGH IMPACT POLYAMIDE COMPOSITION

[75] Inventors: Tetsuo Hamada; Junichi Nakahashi, both of Nobeoka; Ryoichi Nakai, Kurashiki, all of Japan

[73] Assignee: Asahi Kasei Kogyo Kabushiki Kaisha, Osaka, Japan

[21] Appl. No.: 174,279

[22] Filed: Mar. 28, 1988

[51] Int. Cl.$^4$ ............................................. C08L 77/00
[52] U.S. Cl. ................................. 525/183; 525/184; 525/383; 525/385; 525/430; 525/432; 525/433; 525/919
[58] Field of Search ............... 525/183, 184, 383, 385, 525/433, 432, 919

[56] References Cited

U.S. PATENT DOCUMENTS

| | | | |
|---|---|---|---|
| 3,845,163 | 10/1974 | Murch | 260/857 |
| 4,086,295 | 4/1978 | Mori et al. | 260/857 |
| 4,105,709 | 8/1978 | Iwami et al. | 260/857 |
| 4,174,358 | 11/1979 | Epstein | 525/183 |
| 4,246,371 | 1/1981 | Meyer et al. | 525/183 |
| 4,299,744 | 11/1981 | Stewart | 525/183 |
| 4,321,336 | 3/1982 | Meyer et al. | 525/183 |
| 4,485,214 | 11/1984 | Ochiai et al. | 525/179 |
| 4,554,320 | 11/1985 | Reimann et al. | 525/183 |

FOREIGN PATENT DOCUMENTS 0147847  11/1981  Japan ................................... 525/183

*Primary Examiner*—Wilbert J. Briggs, Sr.
*Assistant Examiner*—A. Carrillo
*Attorney, Agent, or Firm*—Armstrong, Nikaido, Marmelstein, Kubovcik & Murray

[57] ABSTRACT

A high impact polyamide composition comprising at least one polyamide, at least one ethylene ionomer resin and at least one oxide or carbonate compound is specific weight proportions, wherein the polyamide has a relative viscosity of at least 3.15 in 98% sulfuric acid. The composition may further comprise an elastomeric olefin copolymer, an elastomeric styrene copolymer and/or a polyvalent alcohol. The polyamide composition has excellent mechanical strength, thermal resistance and impact strength even at weld-line portions so that it can advantageously be employed for manufacturing various shaped articles, such as automobile parts and sporting goods.

3 Claims, No Drawings

HIGH IMPACT POLYAMIDE COMPOSITION

BACKGROUND OF THE INVENTION

1. Field Of The Invention

The present invention relates to a high impact polyamide composition. More particularly, the present invention is concerned with a polyamide composition comprising at least one polyamide having a specific relative viscosity in sulfuric acid, at least one ethylene ionomer resin and at least one monoepoxy or carbonate compound. The polyamide composition may further comprise an elastomeric olefin copolymer, an elastomeric styrene copolymer, and/or a polyvalent alcohol. The polyamide composition has excellent mechanical strength and thermal resistance properties so that it can advantageously be employed in the manufacture of various automobile parts and sporting goods. The polyamide composition also has excellent impact strength, especially excellent weld-line impact strength.

2. Discussion Of Related Art

Heretofore, various polyamide compositions having improved impact strength have been proposed. For example, these include a polyamide composition comprising a polyamide and, blended therewith, an ethylene ionomer resin (see, for example, U.S. Pat. No. 3,845,163 and Japanese Patent Application Publication Specification No. 54-4743/1979), and a polyamide composition comprising a polyamide and, blended therewith, an ionomer resin or an elastomer having a low tensile elasticity and having a specific polar group, capable of bonding with the polyamide, wherein particles of the ionomer resin or elastomer having a diameter of about 1 μm or less are dispersed in the polyamide (see, for example, U.S. Pat. No. 4,174,358. Moreover, the known polyamide compositions include a polyamide composition comprising a polyamide and, blended therewith, an ionomer resin and a monoepoxy or carbonate compound (see, for example, U.S. Pat. No. 4,086,295, and a polyamide composition comprising a polyamide and, blended therewith, an ionomer and an elastomeric olefin copolymer (see, for example, U.S. Pat. No. 4,485,214.

All of the above-mentioned known polyamide compositions, however, have a drawback in that although shaped articles made therefrom exhibit improved impact strength at their portions other than the weld-line portions, they are not always good with respect to impact strength at their weld-line portions and the average of the impact strengths at their weld-line portions is low. Weld-lines are the lines or surfaces along which a polymer must reunite and adhere to itself after flowing around an interference during molding. In the manufacture of a shaped article from polyamide compositions, the shaped articles, except those having an extremely simple configuration, are generally caused to have one or more weld-lines. If the shaped articles are poor with respect to the impact strength at their weld-line portions, they have difficulties in practical use.

SUMMARY OF THE INVENTION

With a view toward developing a polyamide composition which is capable of providing shaped articles which are excellent in Izod impact strength at their weld-line portions as well as in portions other than the weld-line portions, the present inventors have conducted extensive and intensive studies. As a result, it has unexpectedly been found that a polyamide composition comprising a polyamide having a relative viscosity as high as 3.15 or more, an ethylene ionomer resin and a monoepoxy or carbonate compound can be easily molded into various shaped articles such as automobile parts, sporting goods and the like by injection molding etc., which articles are excellent in Izod impact strength at their weld-line portions as well as at portions other than the weld-line portions, as compared to conventional polyamide compositions. It has also been found that the above polyamide composition can be further improved with respect to the Izod impact strength at the weld-line portions of shaped articles obtained therefrom by addition thereto of an elastomeric olefin copolymer, an elastomeric styrene copolymer and/or a polyvalent alcohol. Based on these novel findings, the present invention has been completed.

It is, therefore, an object of the present invention to provide a novel high impact polyamide composition which is useful for forming a shaped article having excellent Izod impact strength at its weld-line portions as well as portions other than the weld-line portions.

The foregoing and other objects, features and advantages of the present invention will be apparent to those skilled in the art from the following detailed description and appended claims.

DETAILED DESCRIPTION OF THE PRESENT INVENTION

According to the present invention, there is provided a high impact polyamide composition comprising at least one polyamide (A), at least one ethylene ionomer resin (B) and at least one monoepoxy or carbonate compound (C) of the formula (I)

wherein $R^1$, $R^2$, $R^3$ and $R^4$ each independently represent a hydrogen atom or a lower alkyl group, and X represents a divalent group of the formula (II) or (III)

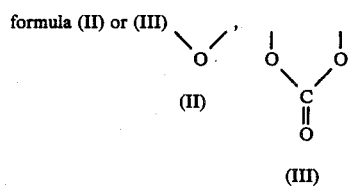

the weight proportion of the polyamide (A) relative to the total of the components (A) and (B) being 60 to 95%, the weight proportion of the ethylene ionomer resin (B) relative to the total of the components (A) and (B) being 40 to 5%, and the weight proportion of the compound (C) relative to the total of the components (A) and (B) being 0.05 to 5.0%;

the polyamide (A) having a relative viscosity of at least 3.15 as measured at 25° C. with respect to a solution prepared by dissolving 1 g of the polyamide in 100 ml of 98% sulfuric acid.

Polyamides useful as the component (A) of the polyamide composition of the present invention are linear high molecular weight compounds having amide linkages. Representative examples of polyamides include homopolymers such as nylon 66, nylon 6, nylon 610, nylon 612 and nylon 46, and copolymers such as nylon 66 copolymers, e.g., nylon 66-6 and nylon 66-610. These polyamides may be used alone or in combination. These homopolymers and copolymers may be used in the form of a polymer blend such as a polymer blend of homopolymers and a polymer blend of a homopolymer and a copolymer. Representative, example of polymer blends of homopolymers include a polymer blend of nylon 66 and nylon 6 and a polymer blend of nylon 66 and nylon 610. Representative examples of polymer blends of a homopolymer and a copolymer include a polymer blend of nylon 66 and a nylon 66 copolymer and a polymer blend of nylon 66, a nylon 66 copolymer and at least one of the other nylons. Among the above-mentioned polyamides, nylon 66, a nylon 66 copolymer comprising nylon 66 as a major component, a polymer blend of nylon 66 and the nylon 66 copolymer, and a polymer blend of nylon 66, the nylon 66 copolymer and at least one of the other nylons are most preferred from the standpoint of heat resistance and mechanical properties.

According to the present invention, for attaining Izod impact strength improvement at weld lines, it is requisite that at least one polyamide to be used as the component (A) of the present composition have a relative viscosity of at least 3.15, preferably at least 3.45, as measured at 25° C. with respect to a solution prepared by dissolving 1 g of the polyamide in 100 ml of 98% sulfuric acid. In the present invention, the relative viscosity is measured in accordance with the method set forth in Japanese Industrial Standard K6810. That is, the relative viscosity of the polyamide is determined by a method in which 1 g of a polyamide is dissolved in 100 ml of 98% sulfuric acid and the viscosity of the resultant polyamide solution is measured at 5° C. by means of an Ostwald viscometer. In the present invention, the component (A) may be comprised of a single polyamide having a relative viscosity of at least 3.15. The component (A) may also be comprised of a plurality of different polyamides each having a relative viscosity of at least 3.15. Alternatively, the component (A) may also be a blend of at least two polyamides having different relative viscosities, provided that the relative viscosity of the blend is at least 3.15. For example, a polyamide having a relative viscosity of less than 3.15 may be used in combination with a different polyamide having a relative viscosity of 3.15 or more, for example more than 3.30, to thereby form a polyamide blend for the component (A), provided that the polyamide blend has a relative viscosity of at least 3.15 as a whole.

By the use of at least one polyamide having a relative viscosity of at least 3.15, preferably at least 3.45, an ethylene ionomer resin as will be defined later can be homogeneously dispersed in the polyamide matrix in the form of uniform particles having a particle size as small as 1 μm or less. This homogeneous dispersion of the ethylene ionomer resin in the polyamide matrix enables the polyamide composition to be formed into a shaped article having improved weld-line impact strength. There is no particular upper limit with respect to the relative viscosity of the component (A). However, the relative viscosity of the polyamide is generally not higher than about 5.0. A polyamide having a relative viscosity higher than 5.0 is not preferred from the viewpoints of melt fluidity and economy.

As mentioned hereinbefore, a blend of polyamides having different relative viscosities may be employed as the component (A) in the present invention. From the viewpoints of imparting excellent melt fluidity to the polyamide composition and obtaining a shaped article having excellent weld-line Izod impact strength, it is preferred that the polyamide blend be comprised of a polyamide having a relative viscosity of at least 3.3 and a polyamide having a relative viscosity of from 2.5 to 3.0, and that the content of the former polyamide in the polyamide blend be 70% by weight or less. When the content of the polyamide having a relative viscosity of at least 3.3 in the polyamide blend exceeds 70% by weight, the polyamide composition tends to have a poor melt fluidity.

The ethylene ionomer resin to be employed as the component (B) of the high impact polyamide composition of the present invention is a copolymer comprising ethylene monomer units, ethylenically unsaturated carboxylic acid monomer units, and ethylenically unsaturated carboxylic acid metal salt monomer units. The copolymer may further comprise ethylenically unsaturated carboxylic ester monomer units. It is preferred that the molar proportion of the ethylene monomer units relative to the total of the monomer units contained in the copolymer be 90 to 98%. The copolymer may be used alone or in combination.

The above-mentioned ethylenically unsaturated carboxylic acid monomer units are units derived from an ethylenically unsaturated carboxylic acid containing 3 to 8 carbon atoms, such as acrylic acid, methacrylic acid and ethacrylic acid.

The ethylenically unsaturated carboxylic acid metal salt monomer units constituting part of the ethylene ionomer resin to be employed in the present invention are units derived from a metal salt of an ethylenically unsaturated carboxylic acid as mentioned above. As suitable metals to be incorporated in the ethylenically unsaturated carboxylic acid metal salt monomer units, there may be mentioned, for example, metals of Groups IA, IB, IIA, IIB and IIIA and fourth period metals of Group VIII of the periodic table, such as Na, K, Cu, Mg, Ca, Ba, Zn, Cd, Al, Fe, Co and Ni. Of these, Na, K, Mg, Ca, Ba and Zn are preferred.

The ethylenically unsaturated carboxylic ester monomer units constituting part of the ethylene ionomer resin to be employed in the present invention are units from an alkyl ester of an ethylenically unsaturated carboxylic acid containing 3 to 8 carbon atoms, such as acrylic acid, methacrylic acid and ethacrylic acid. Representative examples of suitable alkyl esters to be employed in the present invention include methyl acrylate, ethyl acrylate, n-butyl acrylate, tert-butyl acrylate, isobutyl acrylate, methyl methacrylate, ethyl methacrylate, n-propyl methacrylate, isopropyl methacrylate, n-butyl methacrylate, tert-butyl methacrylate and isobutyl methacrylate. Of these, methyl acrylate, ethyl acrylate, methyl methacrylate, isobutyl acrylate and n-butyl methacrylate are preferred.

The ethylene ionomer resin to be employed in the present invention may be produced according to customary procedures. For example, the resin may be produced by first copolymerizing ethylene with an ethylenically unsaturated carboxylic ester according to the known high-pressure ethylene polymerization method, subsequently saponifying the resultant copolymer and finally subjecting the saponified copolymer to reaction for the formation of the metal salt. Generally, it is difficult to produce a copolymer of ethylene and an ethylenically unsaturated carboxylic ester having an ethylene unit molar proportion of less than 90%, using a conventional device for preparing a high-pressure polyethylene. On the other hand, when the ethylene unit molar ratio exceeds 98%, the impact strength of the ultimate shaped article will be insufficient.

With respect to the ethylene ionomer resin to be employed in the present invention, it is preferred that the number of moles of ethylenically unsaturated carboxylic ester monomer units ($\alpha$), the number of moles of ethylenically unsaturated carboxylic acid monomer units ($\beta$) and the number of moles of ethylenically unsaturated carboxylic acid metal salt monomer units ($\gamma$) satisfy the inequalities:

$$0 \leq \frac{\alpha}{\alpha + \beta + \gamma} \leq 0.6, \text{ and}$$

$$0.1 \leq \frac{\gamma}{\alpha + \beta + \gamma} \leq 0.9.$$

In general, the greater the content of the ethylenically unsaturated carboxylic ester monomer units in the ionomer resin, the greater the improvement in impact strength of the polyamide composition. This is especially true when nylon 66 is used as the component (A). However, when the content of the ester monomer units is too large, especially when the value of the formula $\alpha/\alpha+\beta+\gamma$ as defined above is more than 0.6, the physical properties, such as tensile strength, of the polyamide composition are disadvantageously deteriorated. With respect to the content of the ethylenically unsaturated carboxylic acid salt monomer units, when the content is too small, especially when the value of the formula $\gamma/\alpha+\beta+\gamma$ as defined above is less than 0.1, the fluidity of the polyamide composition in its molten state is disadvantageously low. On the other hand, when the content is large, especially when the value of the formula $\gamma/\alpha+\beta+\gamma$ is more than 0.9, the improvement in impact strength of the polyamide composition is insufficient. It is required that the ethylenically unsaturated carboxylic acid monomer units be present in the ethylene ionomer resin because these units increase the affinity between the ethylene ionomer resin and the polyamide in the polyamide composition of the present invention.

The ethylene ionomer resin to be employed in the present invention may preferably have a melt index of from 0.2 to 5 g/10 min as measured at a cylinder temperature of 190° C. under a load of 2160 g in accordance with ASTM D-1238. When the melt index of the ethylene ionomer resin is less than 0.2, the polyamide composition not only has poor melt fluidity and impact strength but also suffers silver streaking in the molding process thereof. On the other hand, when the melt index of the ethylene ionomer resin is more than 5, the polyamide composition has a poor impact strength.

Moreover, the polyamide composition of the present invention may contain at least one elastomeric copolymer (D) which is selected from the group consisting of elastomeric olefin copolymers and elastomeric styrene copolymers.

The elastomeric olefin copolymer may be a copolymer of ethylene and an alpha-olefin having at least 3 carbon atoms, preferably 3 to 8 carbon atoms. As specific examples of such a copolymer, there may be mentioned, for example, poly(ethylene- co-propylene), poly(ethylene-cobutene-1), poly(ethylene-co-hexene-1), poly(ethylene-co-4-methylbutene-1) and poly(ethylene-co-4-methylpentene-1). These may be used either alone or in mixture. Of these, poly(ethylene-co-propylene) and poly(ethylene-co-butene-1) are preferred.

In place of the above copolymer of ethylene and an alpha-olefin having at least 3 carbon atoms, there may be employed as the elastomeric olefin copolymer a terpolymer of ethylene, an alpha-olefin having at least 3 carbon atoms and an unconjugated diene monomer. As the suitable diene monomer, there may be mentioned, for example, methylene norbornene, ethylidene-norbornene, 1,4-hexadiene and dicyclopentadiene.

The molar proportion of each component of the elastomeric olefin copolymer is not critical. However, it is preferred that the content of alpha-olefin monomer units in the copolymer be 10 to 40% by mole, more preferably 15 to 35% by mole, because the glass transition temperature and the degree of crystallinity of the elastomeric olefin copolymer must be low to ensure a substantial improvement of the impact strength at low temperatures of the polyamide composition of the present invention.

On the other hand, as the elastomeric styrene copolymer, there may be mentioned, for example, styrene-butadiene rubber and a hydrogenated block copolymer of styrene and butadiene.

The elastomeric olefin copolymer to be employed in the present invention preferably has a mel index of from 1 to 10 g/10 min as measured at a cylinder temperature of 190° C. under a load of 2160 g in accordance with ASTM D-1238. When the melt index of the elastomeric olefin copolymer is less than 1, the polyamide composition tends to not only have insufficient melt fluidity and impact strength but also suffers silver streaking in the molding process thereof. On the other hand, when the melt index of the elastomeric olefin copolymer is more than 10, the polyamide composition tends to have insufficient impact strength. With respect to the elastomeric styrene copolymer, it preferably has a melt index of from 0.01 to 30 g/10 min as measured at a cylinder temperature of 230° C. under a load of 2160 g in accordance with ASTM D-1238. When the melt index of the elastomeric styrene copolymer is less than 0.01, the polyamide composition tends to not only have insufficient melt fluidity and impact strength but also suffers silver streaking in the molding process thereof. On the other hand, when the melt index of the elastomeric styrene copolymer is more than 30, the polyamide composition tends to have insufficient impact strength.

The elastomeric olefin copolymer or elastomeric styrene copolymer in the polyamide composition serves to improve the impact strength at low temperatures of the composition. The weight proportion of the ethylene ionomer resin to the elastomeric copolymer in the polyamide composition is generally from 30% to 95%. When the amount of the elastomeric copolymer is too small, i.e., less than 5% relative to the amount of the ethylene ionomer resin, incorporation of the elastomeric copolymer in the polyamide composition does not lead to desirable impact strength improvement at low temperatures. On the other hand, when the amount of the elastomeric copolymer is too large, i.e., more than 70% relative to the amount of the ethylene ionomer resin, properties such as impact strength of the polyamide composition tend to deteriorate.

In the polyamide composition of the present invention, the weight proportion of the polyamide (A) relative to the total of the components (A) and (B) or the total of the components (A), (B) and (D) is 60 to 95%, and the weight proportion of the ethylene ionomer resin (B) relative to the total of the components (A) and (B) or the weight proportion of the total of the components (B) and (D) relative to the total of the components (A), (B) and (D) is 0 to 5%.

In the composition of the present invention, there is incorporated as the component (C) at least one monoepoxy or carbonate compound of the formula (I)

wherein $R^1$, $R^2$, $R^3$, $R^4$, and X are as defined above.

It is preferred that each of $R^1$, $R^2$, $R^3$ and $R^4$ have 1 to 3 carbon atoms.

Representative examples of monoepoxy compounds include ethylene oxide, propylene oxide and butylene oxide, and Representative examples of carbonate compounds include ethylene carbonate, propylene carbonate and butylene carbonate.

The weight proportion of the compound (C) relative to the total of the components (A) and (B) or the total of the components (A), (B) and (D) is in the range of from 0.05 to 5.0%, preferably 0.5 to 3.0%.

The monoepoxy compounds and carbonate compounds are believed to chemically bind the polyamide with the ethylene ionomer resin. Also, it is believed that the monoepoxy compounds and carbonate compounds form partial crosslinking between the polyamides and between the ethylene ionomer resins. The above-mentioned binding and crosslinking would stabilize the morphology of the dispersed particles of the ethylene ionomer resin in the polyamide composition, thereby improving the Izod impact strength, particularly at the weld lines where complicated melt flow of the polyamide composition occurs.

When the weight proportion of the component (C) relative to the total of the components (A) and (B) or the total of the components (A), (B) and (D) is less than 0.05%, the above-mentioned impact strength improvement cannot be attained. On the other hand, when the weight proportion of the component (C) exceeds 5.0%, excessive gelation occurs during the melt kneading of the polyamide composition, thereby causing the production efficiency to be lowered. Moreover, when the weight proportion of the component (C) exceeds 5.0%, a portion of the component (C) remains unreacted and is left in the ultimate shaped article. Further, the injection molding of this composition produces a shaped article having undesirable silver streaks on its surface, which lower the commercial value of the shaped article. The incorporation of the component (C) in the polyamide composition in an amount exceeding 5.0% causes the impact strength of the polyamide composition to be low.

With respect to the polyamide composition of the present invention, use of a polyvalent alcohol having 2 to 20 carbon atoms as a component (E) together with the above-mentioned component (C) can further enhance the impact strength-improving effect of the present invention. This polyvalent alcohol acts as a dispersion medium for the monoepoxy compounds and carbonate compounds, and facilitates their dispersion in the polymer.

Suitable examples of polyvalent alcohols include glycerin, ethylene glycol and pentaerythritol. The polyvalent alcohol is preferably used in the polyamide composition in a weight proportion of 10 to 100% relative to the compound (C). When the weight proportion is less than 10%, the dispersion of the compound (C) tends to be insufficient. On the other hand, use of the polyvalent alcohol in a weight proportion of more than 100% does not contribute to further improvement of the dispersion of the compound (C).

In manufacturing the polyamide composition of the present invention, it is necessary to simultaneously melt knead the components (A), (B), (C), optionally together with the component (D) and/or the component (E). Desired weld-line impact strength improvement cannot be attained by melt kneading in a manner where the components (A) and (C) are first melt kneaded and the resultant blend is melt kneaded with the component (B). This fact evidences that the component (C), i.e., monoepoxy or carbonate compound, is involved in the binding between the polyamide and the ethylene ionomer resin.

The above-mentioned melt kneading may be conveniently conducted using a customary extruder. The components of the polyamide composition may be melt kneaded at a temperature which is higher than the melting temperature of the polyamide but lower than the decomposition temperature of the polyamide.

For example, when the polyamide is nylon 66, the melt kneading temperature is generally in the range of from 260° to 310° C. When the polyamide is nylon 6, the melt kneading temperature is generally in the range of from 230° to 310° C. The residence time of the components in the extruder is generally in the range of from 30 sec to 5 min. With respect to the extruder apparatus, a twin screw extruder is preferred to a single screw extruder.

When the component (D), i.e., at least one elastomeric olefin copolymer and/or at least one elastomeric styrene copolymer, is used in the present invention, the component (D) may either be simultaneously melt kneaded with the components (A), (B) and (C), optionally with the component (E), or first melt kneaded with the component (B) and subsequently melt kneaded with the components (A) and (C), optionally with the component (E).

For example, the polyamide composition according to the present invention may be manufactured as follows. Polyamide pellets, ethylene ionomer resin pellets, elastomeric olefin or styrene copolymer pellets, a monoepoxy or carbonate compound and a polyvalent alcohol compound are blended together in a tumbler blender or by a Henschel mixer. The resultant blend is melt kneaded by means of a twin screw extruder under conditions as mentioned hereinbefore. In this instance, there can be employed a charge method in which only the polyamide pellets are supplied from the hopper of the extruder and the other polymer pellets and compounds are fed from the vent aperture of the extruder.

Additives of the types generally employed for a polyamide composition may be added to the polyamide composition of the present invention, if desired. Examples of such additives are a lubricant such as a stearic metal salt, ethylenebisstearylamide and a wax; a heat resisting agent such as a copper compound, a metal halide and an organic heat stabilizer; a weather resisting agent such as a manganese compound and carbon black; a reinforcing material such as glass fibers, talc, kaolin, mica, wollastonite and carbon fibers; and a colorant such as a pigment and a dye. Other additives such as a heat stabilizer and a weather resisting agent of the type employed for an ethylene ionomer resin, an elastomeric olefin copolymer and an elastomeric styrene copolymer may also be added to the polyamide composition of the present invention, if desired.

Any desired shaped articles such as automobile parts, sporting goods and the like can be readily produced from the polyamide composition of the present invention by means of, for example, an injection molding machine. Shaped articles from the polyamide composition of the present invention have an excellent impact strength, as compared to that of shaped articles made from conventional polyamide compositions. In particular, with respect to a shaped article made from the polyamide composition of the present invention, the Izod impact strength variation from point to point is advantageously small over the entire body of the article, especially between the non-weld-line portions and the weld-line portion thereof. Also, with respect to a shaped article made from the polyamide composition of the present invention, the average Izod impact strength over the entire body of the article is advantageously high. Accordingly, shaped articles made from the polyamide composition of the present invention can advantageously be employed in various applications where extremely high impact strength is required. Thus, the polyamide composition of the present invention can provide very strong automobile parts and sporting goods.

DETAILED DESCRIPTION OF PREFERRED EMBODIMENTS

The present invention will now be described in more detail with reference to the following Examples and Comparative Examples, which should not be construed as limiting the scope of the present invention.

With respect to the following Examples and Comparative Examples, the physical properties were measured as follows.

(1) Weld-Line Izod Impact Strength

Izod impact strength was measured at 23° C. in accordance with ASTM-D256, except that a strip-form test specimen having a weld line perpendicular to the lengthwise direction of the strip, which line is in the middle of the length of the strip, was prepared, and that a notch was made at one end of the line. The test specimen was prepared by injection molding a polyamide composition at a cylinder temperature of 280° C. using a metal mold having two inlets and a strip-form cavity therebetween. The polyamide composition was injected into the cavity simultaneously from both the inlets.

(2) Izod Impact Strength at Low Temperature

Izod impact strength was measured at 0° C. in accordance with ASTM-D256.

(3) Silver Streaks

Strip-form test specimens were prepared by injection molding a polyamide composition at a cylinder temperature of 300° C. The surface of each of the test specimens was observed by naked eye to determine the occurrence of silver streaks.

(4) Melt Fluidity

Using an injection molding machine having a cylinder temperature of 280° C., a polyamide composition was injected into the cavity of a metal mold maintained at a temperature of 80° C., which cavity had been provided in the form of a spiral passage having a width of 15 mm, a thickness of 2 mm and a total length of 1340 mm. The polyamide composition so injected flowed over a certain distance in the cavity, and solidified. The distance from the entrance of the cavity was measured as a parameter for measuring the melt fluidity of the polyamide composition.

(5) Diameter of Ionomer Resin or Elastomer Component Particles Dispersed in the Polyamide Composition A test specimen obtained by injection molding at a cylinder temperature of 280° C. was immersed in liquid nitrogen for 1 hour and then cracked by applying an impact thereto. Ionomer resin or elastomer components present in the surface portion of the thus obtained section were extracted with heated xylene, and then the resultant section was observed using a scanning electron microscope (SEM) to determine the particle diameters. The extraction of ionomer resin or elastomer components led to a formation of holes in the section, which holes were observable using the electron microscope.

The below-defined polymers were employed in the following Examples and Comparative Examples, and the meaning of each of the abbreviations employed is as follows.

POLYMERS

Ethylene ionomer resin No. 1
a copolymer comprising
94.5 mol % of ethylene monomer units,
2.0 mol % of acrylic acid monomer units,
2.2 mol % of zinc acrylate monomer units, and
1.3 mol % of isobutyl acrylate monomer units;
and having a melt index of 1.0 g/10 min.

Ethylene ionomer resin No. 2
a copolymer comprising
94.1 mol % of ethylene monomer units,
2.7 mol % of acrylic acid monomer units, and
3.2 mol % of zinc acrylate monomer units; and
having a melt index of 0.4 g/10 min.

Ethylene ionomer resin No. 3
a copolymer comprising
91 mol % of ethylene monomer units,
5 mol % of methacrylic acid monomer units, and
4 mol % of zinc methacrylate monomer units; and
having a melt index of 0.4 g/10 min.
Elastomeric olefin copolymer:
a copolymer comprising
90.4 mol % of ethylene monomer units, and
9.6 mol % of propylene monomer units; and having a melt index of 4.5 g/10 min.

Elastomeric styrene copolymer

Kraton G 1652 manufactured by Shell Chemical Co.
(Abbreviations)
EC: ethylene carbonate
PC: propylene carbonate
GL: glycerin
PE: pentaerythritol

EXAMPLE 1

76 Parts by weight of a nylon 66 having a relative viscosity of 3.76, 24 parts by weight of ethylene ionomer resin No. 1 and 2.0 parts by weight of ethylene carbonate were charged into a tumbler blender and blended for 3 minutes, and then the blend was kneaded at a cylinder temperature of 280° C. at a screw revolution speed of 200 rpm and extruded at an extrusion rate of 8 kg/hr by means of a twin-screw extruder PCM30(manufactured and sold by Ikegai Corp., Japan) to obtain pellets. The thus obtained pellets were subjected to the weld-line Izod impact strength measurement. The result is shown in Table 1.

EXAMPLE 2

Substantially the same procedures as described in Example 1 were repeated, except that a nylon 66 having a relative viscosity of 3.30 was used. The result is shown in Table 1.

COMPARATIVE EXAMPLE 1

Substantially the same procedures as described in Example 1 were repeated, except that a nylon 66 having a relative viscosity of 2.86 was used. The result is shown in Table 1.

COMPARATIVE EXAMPLE 2

Substantially the same procedures as described in Example 1 were repeated, except that ethylene carbonate was not used. The result is shown in Table 1.

As apparent from the results shown in Table 1, in the case where the relative viscosity of the nylon 66 used is less than 3.15, and in the case where neither a monoepoxy compound nor a carbonate compound is used, the Izod impact strength of the polyamide composition is low.

EXAMPLES 3 TO 5 AND COMPARATIVE EXAMPLE 3

Polymer blending, extrusion and pelletization were conducted in substantially the same manner as described in Example 1, except that a pelletized nylon-66 having a relative viscosity of 2.86 and a pelletized nylon-66 having a relative viscosity of 3.76 were employed in proportions as indicated in Table 1. The resultant pellets of the polyamide compositions were molded, and subjected to Izod impact strength and melt fluidity measurements.

The melt fluidity of the polyamide compositions of Examples 1 and 2 was also measured. The results are show in Table 1.

5 and Comparative

The results of Examples 3 to 5 and Comparative Example 3 demonstrate that with respect to polyamide compositions in which a polyamide having a relative viscosity of at least 3.3 is employed in combination with a polyamide having a relative viscosity within the range of from 2.5 to 3.0, when the average relative viscosity thereof is at least 3.15, the polyamide compositions exhibit excellent Izod impact strength at their weld-lines.

As apparent from the results of Examples 1 and 3 to 5, a polyamide composition containing as the component (A) a polyamide blend comprising a polyamide having a relative viscosity of at least 3.3 and a polyamide having a relative viscosity of from 2.5 to 3.0 in a weight proportion of 70/30 or less has an excellent fluidity.

Further, as apparent from a comparison of Example 2 with Example 4, even if the relative viscosities are the same, i.e., 3.30, the polyamide composition containing as the component (A) a polyamide blend of a nylon 66 having a relative viscosity of 2.86 and a nylon 66 having a relative viscosity of 3.76 exhibits better melt fluidity and weld-line impact strength than the polyamide composition containing as the component (A) a single kind of a polyamide, i.e., a nylon 66 having a relative viscosity of 3.30.

EXAMPLE 6

70 Parts by weight of a nylon 66 having a relative viscosity of 3.76, 22.5 parts by weight of ethylene ionomer resin No. 1, 7.5 parts by weight of ethylene propylene rubber (EP) and 1.5 parts by weight of ethylene carbonate were charged into a tumbler blender and blended for 3 minutes, and then the blend was melt kneaded and extruded by means of a twin-screw extruder PCM30(manufactured and sold by Ikegai Corp., Japan) to obtain strands. The strands were cooled in water and cut with a cutter to obtain pellets. The thus obtained pellets were subjected to weld-line Izod impact strength measurement and Izod impact strength measurement at low temperature. The results are shown in Table 1.

EXAMPLE 7

Pellets were prepared in substantially the same manner as in Example 6 except that Kraton G1652 (a thermoplastic styrene elastomer manufactured and sold by Shell Chemical Co., Ltd.) was used in place of the ethylene propylene rubber. The obtained pellets were subjected to weld-line Izod impact strength measurement and Izod impact strength measurement at low temperature. The results are shown in Table 2.

EXAMPLE 8

Polyamide composition pellets were produced in substantially the same manner as in Example 6, except that there were employed 35 parts by weight of a nylon 66 having a relative viscosity of 2.86 and 35 parts by weight of a nylon 66 having a relative viscosity of 3.76 instead of 70 parts by weight of a nylon 66 having a relative viscosity of 3.76. The results are shown in Table 2.

EXAMPLE 9

Polyamide composition pellets were produced in substantially the same manner as in Example 8, except that Kraton G1652 as mentioned hereinbefore was used in place of the ethylene propylene rubber. The results are shown in Table 2.

EXAMPLE 10

Substantially the same procedures as described in Example 6 were repeated, except that 30 parts by weight of ethylene ionomer resin No. 1 were used in place of the ethylene propylene rubber, to thereby obtain a polyamide composition. With respect to the polyamide composition, Izod impact strength at 0° C. and Izod impact strength at the weld-line thereof were measured in accordance with ASTM-D256. The results are shown in Table 2.

From the Izod impact strengths of the compositions at 0° C. measured in Examples 6, 7 and 10, it is apparent that the incorporation of an elastomeric olefin or styrene copolymer, namely an ethylene propylene rubber or a Kraton, leads to an improvement in high-impact properties.

As is apparent from the results in Examples 8 and 9, the composition in which an ethylene propylene rubber or a Kraton is incorporated is excellent in high-impact properties at 0° C. even in the case where a combination of a polyamide having a relative viscosity of 3.3 or more and another polyamide having a relative viscosity of from 2.5 to 3.0 is used.

EXAMPLE 11 TO 14 AND COMPARATIVE EXAMPLES 4 AND 5

Ethylene carbonate was added to a mixture of 76 parts by weight of a nylon 66 having a relative viscosity of 3.76, 18 parts by weight of ethylene ionomer resin No. 1 and 6 parts by weight of an ethylene propylene rubber in various amounts of from 0 to 8.0 parts by weight as shown in Tables 2 and 3. In substantially the same manner as described in Example 1, from each of the resulting mixtures, polyamide composition pellets were prepared and subjected to weld-line Izod impact strength measurement and silver streak observation. The results are shown in Tables 2 and 3.

As is apparent from the results of Examples 11 to 14 and Comparative Examples 4 and 5, the composition containing no ethylene carbonate exhibited low weld-line Izod impact strength. On the other hand, with respect to the compositions each containing an ethylene carbonate, the weld-line Izod impact strength increased according to an increase in the amount of ethylene carbonate added, but when the amount of ethylene carbonate was as high as 8 parts by weight, the weld-line Izod impact strength was decreased and formation of a silver streak was observed. Therefore, the polyamide composition containing ethylene carbonate in an amount as high as 8 parts by weight is disadvantageous in practical use.

EXAMPLES 15 TO 19

Glycerin was blended with a nylon 66, ethylene ionomer resin No. 1, an ethylene propylene rubber and ethylene carbonate in amount ratios as shown in Table 3 as follows. First, 76 parts by weight of nylon 66 having a relative viscosity of 3.76, 18 parts by weight of ethylene ionomer resin No. 1, 6 parts by weight of ethylene propylene rubber and 0 to 3 parts by weight of glycerin were charged into a tumbler blender and blended for 3 minutes. Then, to the resulting mixture was added 2.0 parts by weight of ethylene carbonate and the mixture was blended for 3 minutes. In substantially the same manner as in Example 1, polyamide composition pellets were prepared from the mixture and subjected to weld-line Izod impact strength measurement. The results are shown in Table 3.

As is apparent from the results for Examples 15 to 19 in Table 1, the Izod impact strengths of the polyamide composition in which glycerin is incorporated, as measured at the weld line of the compositions, are high as compared with those of the compositions in which glycerin is not incorporated, and are increased with an increase in the amount of glycerin incorporated, but when the ratio of the amount of ethylene carbonate to that of glycerin is decreased to less than 1:1, the above-mentioned increase of the Izod impact strength of glycerin incorporated compositions does not result.

EXAMPLE 20

Substantially the same procedures as those of Example 16 were repeated, except that 38 parts by weight of a nylon 66 having a relative viscosity of 2.86 and 38 parts by weight of a nylon 66 having a relative viscosity of 3.76 were used, to thereby obtain polyamide composition pellets. The pellets were subjected to the measurement of the weld-line Izod impact strength. The fluidity at the time of molding was measured with respect to the polyamide compositions of Examples 17 and 20. The results are shown in Table 1.

From the comparison of Example 20 with Example 17, it is apparent that the polyamide composition which contains a combination of a nylon 66 having a relative viscosity of 2.86 and another nylon 66 having a relative viscosity of 3.76 and which has an average relative viscosity of 3.30 is excellent both in Izod impact strength as measured at the weld-line of the composition and in fluidity at the time of molding, as compared with the composition containing a nylon 66 having a relative viscosity of 3.30 alone.

EXAMPLE 21

35 parts by weight of nylon 66 having a relative viscosity of 2.86, 35 parts by weight of nylon 66 having a relative viscosity of 3.76, 22.5 parts by weight of ethylene ionomer resin No. 3, 7.5 parts by weight of ethylene propylene rubber and 0.25 part by weight of glycerin were charged into a tumbler blender and blended for 3 min to thereby obtain a blend. Then, to the blend were added 0.5 part by weight of ethylene carbonate and 0.2 part by weight of 4,4'-butylidene-bis(3-methyl-6-tert-butyl phenol) (Yoshinox BB, manufactured and sold by Yoshitomi Pharmaceutical Industries, Ltd., Japan), and the resulting mixture was blended for 3 min. The resulting blend was subjected to kneading and extrusion in substantially the same manner as described in Example 1, to thereby obtain polyamide composition pellets. The pellets were subjected to the measurements of the weld-line Izod impact strength and the Izod impact strength at 0° C. The results are shown in Table 1. As is apparent from Table 1, the composition is high both in weld-line Izod impact strength and in Izod impact strength at 0° C. Examples 22 to 27 and Comparative Examples 6 and 7

Eight types of polyamide composition pellets were separately prepared in substantially the same manner as in Examples 16 to 20 except that nylon 6, nylon 610, ethylene ionomer resin Nos. 1 and 2, propylene carbonate and pentaerythritol were used as components in various loading as shown in Tables 3 and 4.

The thus obtained polyamide composition pellets were subjected to the measurement of the weld-line Izod impact strength. The results are shown in Tables 3 and 4. As is apparent from the results, the polyamide compositions obtained in Examples 22 to 27, which have relative viscosities in the range of 3.15 or more, are excellent in weld-line Izod impact strength, while the compositions obtained in Comparative Examples 6 and 7, which have relative viscosities in the range of less than 3.15 are poor in weld-line impact strength.

TABLE 1

| | Type | Example 1 Ny66 | Example 2 Ny66 | Comparative Example 1 Ny66 | Comparative Example 2 Ny66 | Example 3 Ny66 | Example 4 Ny66 | Example 5 Ny66 | Comparative Example 3 Ny66 | Example 6 Ny66 |
|---|---|---|---|---|---|---|---|---|---|---|
| Polyamide | 1-component $\eta r$ | 3.76 | 3.30 | 2.86 | 3.76 | | | | | 3.76 |
| | 2 components Weight proportion of polyamide ($\eta r = 2.86$) | | | | | 30 | 50 | 60 | 70 | |
| | Weight proportion of polyamide ($\eta r = 3.76$) | | | | | 70 | 50 | 40 | 30 | |
| | Average $\eta r$ | | | | | 3.53 | 3.30 | 3.19 | 3.07 | |
| Ethylene ionomer | Loadings(wt. parts) | 76 | 76 | 76 | 76 | 76 | 76 | 76 | 76 | 70 |
| | Type | (1) | (1) | (1) | (1) | (1) | (1) | (1) | (1) | (1) |
| | Loadings(wt. parts) | 24 | 24 | 24 | 24 | 24 | 24 | 24 | 24 | 22.5 |
| Elastomeric olefin or styrene copolymer | Type | | | | | | | | | EP |
| | Loadings(wt. parts) | | | | | | | | | 7.5 |
| Carbonate or monoepoxy compound | Type | EC | EC | EC | — | EC | EC | EC | EC | EC |
| | Loadings(wt. parts) | 2.0 | 2.0 | 2.0 | — | 2.0 | 2.0 | 2.0 | 2.0 | 1.5 |
| Polyvalent alcohol | Type | | | | | | | | | |
| | Loadings(wt. parts) | | | | | | | | | |
| Izod impact strength at 23° C. at weld-line (Kg·cm/cm) | | 50 | 40 | 15 | 10 | 50 | 50 | 45 | 25 | 60 |
| Melt fluidity(cm) | | 18 | 20 | 37 | | 23 | 24 | 25 | 27 | |
| Silver streak | | | | | | | | | | |
| Izod impact strength at 0° C. (Kg·cm/cm) | | | | | | | | | | 60 |
| Dispersed particle diameter of ionomer resin or elastomer (μm) | | 0.8 or less | | 1.2 or less | | | 0.9 or less | | | |

Abbreviations
EP: Ethylene propylene rubber
EC: Ethylene carbonate
Ny66: Nylon 66

TABLE 2

| | Type | Example 7 Ny66 | Example 8 Ny66 | Example 9 Ny66 | Example 10 Ny66 | Comparative Example 4 Ny66 | Example 11 Ny66 | Example 12 Ny66 | Comparative Example 13 Ny66 | Example 14 Ny66 |
|---|---|---|---|---|---|---|---|---|---|---|
| Polyamide | 1-component $\eta r$ | 3.76 | | | 3.76 | 3.76 | 3.76 | 3.76 | 3.76 | 3.76 |
| | 2 components Weight proportion of polyamide ($\eta r = 2.86$) | | 50 | 50 | | | | | | |
| | Weight proportion of polyamide ($\eta r = 3.76$) | | 50 | 50 | | | | | | |
| | Average $\eta r$ | | 3.30 | 3.30 | | | | | | |
| Ethylene ionomer | Loadings(wt. parts) | 70 | 70 | 70 | 70 | 76 | 76 | 76 | 76 | 76 |
| | Type | (1) | (1) | (1) | (1) | (1) | (1) | (1) | (1) | (1) |
| | Loadings(wt. parts) | 22.5 | 22.5 | 22.5 | 30 | 18 | 18 | 18 | 18 | 18 |
| Elastomeric olefin or styrene copolymer | Type | K | EP | K | | EP | EP | EP | EP | EP |
| | Loadings(wt. parts) | 7.5 | 7.5 | 7.5 | | 6 | 6 | 6 | 6 | 6 |
| Carbonate or monoepoxy compound | Type | EC | EC | EC | EC | — | EC | EC | EC | EC |
| | Loadings(wt. parts) | 1.5 | 1.5 | 1.5 | 1.5 | — | 0.05 | 0.5 | 3.0 | 5.0 |
| Polyvalent alcohol | Type | | | | | | | | | |
| | Loadings(wt. parts) | | | | | | | | | |
| Izod impact strength at 23° C. at weld-line (Kg·cm/cm) | | 60 | 65 | 65 | 60 | 20 | 40 | 55 | 70 | 70 |
| Melt fluidity(cm) | | | | | | | | | | |
| Silver streak | | | | | | none | none | none | none | nearly none |
| Izod impact strength at 0° C. (Kg·cm/cm) | | 55 | 70 | 70 | 25 | | | | | |
| Dispersed particle diameter of | | | | | | | | | | |

TABLE 2-continued

| | Type | Example 7 Ny66 | Example 8 Ny66 | Example 9 Ny66 | Example 10 Ny66 | Comparative Example 4 Ny66 | Example 11 Ny66 | Example 12 Ny66 | Comparative Example 13 Ny66 | Example 14 Ny66 |
|---|---|---|---|---|---|---|---|---|---|---|
| ionomer resin or elastomer (μm) | | | | | | | | | | |

Abbreviations
EP: Ethylene propylene rubber
K: Kraton G
EC: Ethylene carbonate
Ny66: Nylon 66

TABLE 3

| | | | Comparative Example 5 Ny66 | Example 15 Ny66 | Example 16 Ny66 | Example 17 Ny66 | Example 18 Ny66 | Example 19 Ny66 | Example 20 Ny66 | Example 21 Ny66 | Example 22 Ny66 |
|---|---|---|---|---|---|---|---|---|---|---|---|
| | | Type | | | | | | | | | |
| Polyamide | 1-component | $\eta r$ | 3.76 | 3.30 | 3.30 | 3.30 | 3.30 | 3.30 | | | 3.52 |
| | | Weight proportion of polyamide ($\eta r = 2.86$) | | | | | | | 50 | 50 | |
| | 2 components | Weight proportion of polyamide ($\eta r = 3.76$) | | | | | | | 50 | 50 | |
| | | Average $\eta r$ | | | | | | | 3.30 | 3.30 | |
| Ethylene ionomer | | Loadings(wt. parts) | 76 | 76 | 76 | 76 | 76 | 76 | 76 | 70 | 76 |
| | | Type | (1) | (1) | (1) | (1) | (1) | (1) | (1) | (3) | (2) |
| | | Loadings(wt. parts) | 18 | 18 | 18 | 18 | 18 | 18 | 18 | 22.5 | 24 |
| Elastomeric olefin or styrene copolymer | | Type | EP | EP | EP | EP | EP | EP | EP | EP | |
| | | Loadings(wt. parts) | 6 | 6 | 6 | 6 | 6 | 6 | 6 | 7.5 | |
| Carbonate or monoepoxy compound | | Type | EC | EC | EC | EC | EC | EC | EC | EC | EC |
| | | Loadings(wt. parts) | 8.0 | 2.0 | 2.0 | 2.0 | 2.0 | 2.0 | 2.0 | 0.5 | 2.0 |
| Polyvalent alcohol | | Type | | GL | GL | GL | GL | GL | GL | GL | GL |
| | | Loadings(wt. parts) | | 0.2 | 1.0 | 2.0 | 3.0 | 1.0 | 0.25 | 1.0 | |
| Izod impact strength at 23° C. at weld-line (Kg · cm/cm) | | | 50 | 50 | 65 | 80 | 90 | 90 | 80 | 100 | 75 |
| Melt fluidity(cm) | | | | | | 20 | | | 25 | | |
| Silver streak | | | observed | | | | | | | | |
| Izod impact strength at 0° C. (Kg · cm/cm) | | | | | | | | | | 50 | |
| Dispersed particle diameter of ionomer resin or elastomer (μm) | | | | | | | | | | | |

Abbreviations
EP: Ethylene propylene rubber
EC: Ethylene carbonate
Ny66: Nylon 66
GL: Glycerin

TABLE 4

| | | | Example 23 Ny610 | Comparative Example 6 Ny6 | Comparative Example 7 Ny610 | Example 24 Ny66 | Example 25 Ny66 | Example 26 Ny66 | Example 27 Ny66 |
|---|---|---|---|---|---|---|---|---|---|
| | | Type | | | | | | | |
| Polyamide | 1-component | $\eta r$ | 3.58 | 2.65 | 2.43 | 3.76 | 3.76 | 3.76 | |
| | | Weight proportion of polyamide ($\eta r = 2.86$) | | | | | | | 50 |
| | 2 components | Weight proportion of polyamide ($\eta r = 3.76$) | | | | | | | 50 |
| | | Average $\eta r$ | | | | | | | 3.30 |
| Ethylene ionomer | | Loadings(wt. parts) | 76 | 76 | 76 | 76 | 76 | 76 | 76 |
| | | Type | (2) | (2) | (2) | (1) | (1) | (1) | (2) |
| | | Loadings(wt. parts) | 24 | 24 | 24 | 18 | 18 | 18 | 18 |
| Elastomeric olefin or | | Type | | | | EP | K | EP | EP |
| | | Loadings(wt. parts) | | | | 6 | 6 | 6 | 6 |

TABLE 4-continued

|  | Type | Example 23 Ny610 | Comparative Example 6 Ny6 | Comparative Example 7 Ny610 | Example 24 Ny66 | Example 25 Ny66 | Example 26 Ny66 | Example 27 Ny66 |
|---|---|---|---|---|---|---|---|---|
| styrene copolymer |  |  |  |  |  |  |  |  |
| Carbonate or monoepoxy compound | Type | EC | EC | EC | PC | PC | EC | EC |
|  | Loadings(wt. parts) | 2.0 | 2.0 | 2.0 | 2.0 | 2.0 | 2.0 | 2.0 |
| Polyvalent alcohol | Type | GL | GL | GL | GL | GL | PE | GL |
|  | Loadings(wt. parts) | 1.0 | 1.0 | 1.0 | 1.0 | 1.0 | 1.0 | 1.0 |
| Izod impact strength at 23° C. at weld-line (Kg · cm/cm) |  | 75 | 30 | 25 | 70 | 70 | 65 | 85 |
| Melt fluidity(cm) |  |  |  |  |  |  |  |  |
| Silver streak |  |  |  |  |  |  |  |  |
| Izod impact strength at 0° C. (Kg · cm/cm) |  |  |  |  |  |  |  |  |
| Dispersed particle diameter of ionomer resin or elastomer (μm) |  |  |  |  |  |  |  |  |

Abbreviations
EP: Ethylene propylene rubber
K: Kraton
EC: Ethylene carbonate
PC: Propylene carbonate
Ny66: Nylon 66
Ny610 Nylon 610
Ny6: Nylon 6
GL: Glycerin
Pentaerythritol

What is claimed is:

1. A high impact polyamide composition comprising at least one polyamide (A), at least one ethylene ionomer resin (B) and at least one carbonate compound (C) of the formula (I)

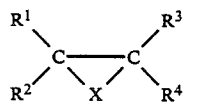

wherein $R^1$, $R^2$, $R^3$ and $R^4$ each independently represent a hydrogen atom or a lower alkyl group, and X represents a divalent group of the formula (III)

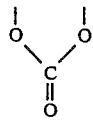

the weight proportion of the polyamide (A) relative to the total of the components (A) and (B) being 60 to 95%, the weight proportion of the ethylene ionomer resin (B) relative to the total of the components (A) and (B) being 40 to 5%, and the weight proportion of the carbonate compound (C) relative to the total of the components (A) and (B) being 0.05 to 5.0%;

the polyamide (A) having a relative viscosity of at least 3.15 as measured at 25° C. with respect to a solution prepared by dissolving 1 g of the polyamide in 100 ml of 98% sulfuric acid.

2. The composition according to claim 1, wherein said ethylene ionomer resin (B) has a melt index of from 0.2 to 5 g/10 min as measured at a cylinder temperature of 190° C. under a load of 2160 g in accordance with ASTM D-1238.

3. The composition according to claim 1, wherein said polyamide (A) comprises a blend of a polyamide (a) having a relative viscosity of at least 3.3 and a polyamide (b) having a relative viscosity of from 2.5 to 3.0, said relative viscosity being measured at 25° C. with respect to a solution prepared by dissolving 1 g of the polyamide in 98% sulfuric acid, the weight proportion of the polyamide (a) relative to the total of the components (a) and (b) being 70% or less.

* * * * *